United States Patent
Toyama

[19]

[11] Patent Number: 6,078,432
[45] Date of Patent: Jun. 20, 2000

[54] ZOOM LENS

[75] Inventor: Nobuaki Toyama, Omiya, Japan

[73] Assignee: Fuji Photo Optical Co., Ltd., Omiya, Japan

[21] Appl. No.: 09/257,024

[22] Filed: Feb. 25, 1999

[30] Foreign Application Priority Data

Mar. 25, 1998 [JP] Japan .................................. 10-096592

[51] Int. Cl.$^7$ .................................................. G02B 15/14
[52] U.S. Cl. .......................... 359/689; 359/739; 359/791
[58] Field of Search .................................. 359/689, 791, 359/740, 739

[56] References Cited

U.S. PATENT DOCUMENTS 5,815,320  9/1998  Hoshi et al. .............................. 359/686
5,886,829  5/1999  Goosey, Jr. ............................... 359/689

FOREIGN PATENT DOCUMENTS 8-43737  2/1996  Japan .

*Primary Examiner*—Georgia Epps
*Assistant Examiner*—Tim Thompson
*Attorney, Agent, or Firm*—Arnold International; Bruce Y. Arnold

[57] ABSTRACT

A zoom lens having three lens groups of positive, positive, and negative refractive power, in order from the object side. A diaphragm is positioned between the first and second lens groups. When zooming from the wide-angle end to the telephoto end, the diaphragm and the third lens group are moved as a unit while the spacing between the first lens group and the diaphragm increases, the spacing between the diaphragm and the second lens group increases, and the spacing between the second lens group and the third lens group decreases. Further, the zoom lens is constructed so as to satisfy the following condition $$-0.75 < R_{G21}/f_w < -0.23$$

where $R_{G21}$ is the radius of curvature of the surface of the second lens group that is nearest the object side, and $f_w$ is the focal length of the zoom lens at the wide-angle end.

15 Claims, 9 Drawing Sheets

ZOOM LENS

BACKGROUND OF THE INVENTION

In recent years, zoom lenses having high variable power have been placed in lens shutter cameras, and zoom lenses have come to be desired in which the zoom ratio is 3 or greater.

As an example of this type of zoom lens, a zoom lens is known such as that disclosed in Japanese Laid Open Patent Publication H08-43737. With this zoom lens, the f-number (hereinafter $F_{NO}$) at the wide-angle end is approximately 4.6, and the various aberrations are well-corrected.

However, the lens described in the above publication is composed of four lens groups. Because zooming is accomplished by changing the spacings between the four lens groups, there has been the problem that the construction of the lens drive mechanism is complex. Thus, a desire has developed for a zoom lens in which the construction of the lens drive mechanism is simple and compact, where there is a wide viewing angle at the wide-angle end, the overall length of the zoom lens is short at the telephoto end, and the zoom lens exhibits high optical performance.

BRIEF SUMMARY OF THE INVENTION

The present invention relates to a zoom lens which is used with a lens shutter camera or a video camera, and which is constructed of three lens groups. By appropriately establishing the lens construction of each lens group, the zoom ratio can be made to be 3 or greater.

A first object of the invention is to provide a zoom lens in which the construction of the lens drive mechanism can be simplified. A second object is to provide a zoom lens having a low $F_{NO}$ and a wide angle of view at the wide-angle end and, at the telephoto end, the overall length of the zoom lens can be made short. A third object is to provide acceptably low aberrations across the entire field of view for object distances from infinity to nearby, thereby offering a compact zoom lens which has a high resolution and a high contrast. A fourth object is to provide a zoom lens in which the field of view at the wide angle end is greater than 70°, wherein the $F_{NO}$ at the telephoto end is less than 10, and in which the zoom ratio is greater than 3.6.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The zoom lens according to the present invention includes, in order from the object side, a first lens group of positive refractive power, a diaphragm, a second lens group of positive refractive power, and a third lens group of negative refractive power. Zooming is accomplished by changing the spacing between these components. The zoom lens is constructed so as to move each of the lens groups and the diaphragm along optical axis X so that, at the time of zooming from the wide-angle end to the telephoto end, the diaphragm and the third lens group are moved as a unit, the spacing between the first lens group and the diaphragm is increased, the spacing between the diaphragm and the second lens group is increased, and the spacing between the second lens group and the third lens group is decreased. The image is formed at image surface 1 which intersects the optical axis X at point P.

In addition, it is desirable that the third lens group include a lens element which has at least one aspherical surface. In addition, it is desirable if Condition (1) below is satisfied:

$$-0.75 < R_{G21}/f_w < -0.23 \qquad \text{Condition (1)}$$

where $R_{G21}$ is the radius of curvature of the surface of the second lens group that is nearest the object side, and $f_w$ is the focal length of the zoom lens at the wide-angle end.

In addition, it is desirable that the surface of the second lens group that is nearest the image side have an aspherical surface. Furthermore, the second lens group desirably includes, in order from the object side, a negative meniscus lens element with its concave surface on the object side; a bi-convex lens element; a lens element which has negative refractive power; and a bi-convex lens element.

An explanation will now be provided of the technical significance of Condition (1), above. Condition (1) insures that coma and curvature of field have acceptably low values. If the upper limit of Condition (1) is exceeded, coma aberrations increase so as to make aberration correction difficult. On the other hand, if the value of $R_{G21}/f_w$ drops below the lower limit of Condition 1, then the curvature of field of the image increases so as to make aberration correction difficult. Thus by satisfying Condition (1), high optical performance can be achieved over the entire range of object distances.

An explanation is provided hereinafter of several embodiments of the present invention, with reference to the drawings.

Embodiment 1

Figure 1:
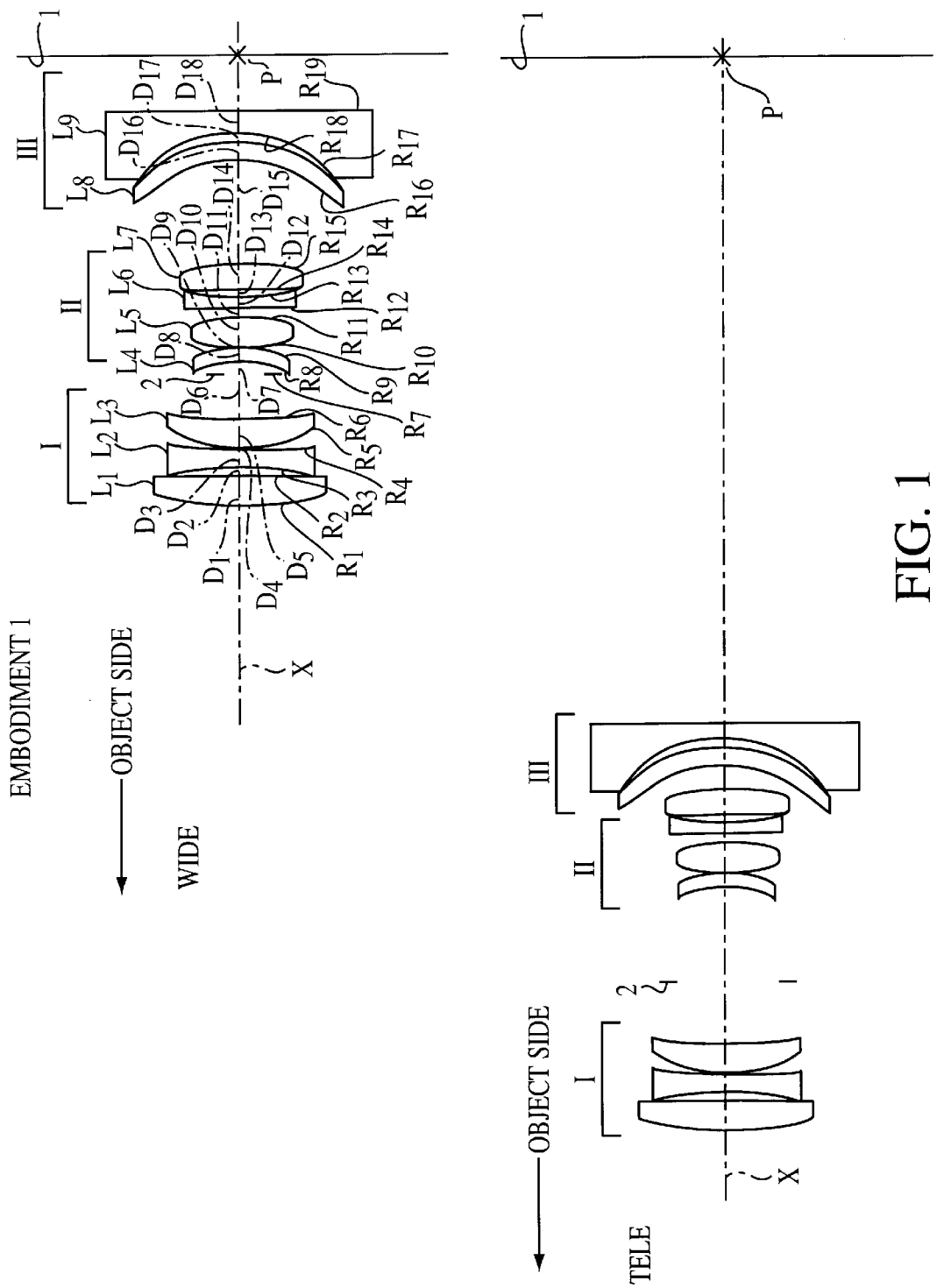
FIG. 1 illustrates the basic lens construction in accordance with a first embodiment of the present invention, at both the wide-angle end and telephoto end.

The zoom lens relating to Embodiment 1 is shown in FIGS. 1(a) and 1(b), which show the position at the wide-angle end and at the telephoto end, respectively. The first lens group I is formed by arranging, in order from the object side, a bi-convex first lens element $L_1$, a bi-concave second lens element $L_2$, and a third lens element $L_3$ which is of positive meniscus shape with its convex surface on the object side.

In addition, the second lens group II is formed by arranging, in order from the object side, a fourth lens element $L_4$ which is of negative meniscus shape with its concave surface on the object side; a fifth lens element $L_5$ that is bi-convex, a sixth lens element $L_6$ which is of negative meniscus shape with its convex surface on the object side; and seventh lens element $L_7$ that is bi-convex. A diaphragm 2, which is moved as a unit with the third lens group III, is arranged between the first lens group I and the second lens group II.

Furthermore, the third lens group III is formed by arranging, in order from the object side, an eighth lens element $L_8$ which is of positive meniscus shape with its concave surface on the object side, and a ninth lens element $L_9$ that is plano-concave with its concave surface on the object side. Also, both surfaces of the seventh lens element $L_7$, and both surfaces of the eighth lens element $L_8$ are aspherical, which enable various aberrations to be reduced.

By moving each of the lens groups I, II, and III when the focal length of the lens is changed during zooming, the luminous flux is converged onto surface 1. Because the diaphragm 2 moves as a unit with the third lens group III, the lens drive mechanism of the zoom lens can be simple, and a measurable reduction in construction costs is easily achieved.

The upper section of Table 1, below, lists the surface number #, in order from the object side, the radius of curvature R (in mm) of each surface near the optical axis X, the on-axis spacing D (in mm) between each surface, as well as the index of refraction $N_d$ and the Abbe number $v_d$ (at the sodium d line) of the lens elements of Embodiment 1. Those surfaces with a * to the right of the surface number in Table 1 are aspherical surfaces, and the aspherical surface shape is expressed by Eq. (A) below.

$$Z = Ch^2/\{1+(1-KC^2h^2)^{1/2}\}+a_4h^4+a_6h^6+a_8h^8+a_{10}h^{10} \quad \text{(Equation A)}$$

where

Z is the length (in mm) of a line drawn from a point on the aspherical surface at height h from the optical axis to the tangential plane of the aspherical surface vertex, C(=1/R) is the curvature of the aspherical surface near the optical axis, h is the height (in mm) from the optical axis, K is the eccentricity, and $a_4$, $a_6$, $a_8$, and $a_{10}$ are the 4th, 6th, 8th, and 10th aspherical coefficients.

The center section of Table 1 lists, for both the wide-angle end (WIDE) and the telephoto end (TELE), the spacing $D_6$ (along the optical axis X) between the first lens group and the diaphragm 2; the spacing $D_7$ between the diaphragm 2 and the second lens group II; and the spacing $D_{15}$ between the second lens group II and the third lens group III.

The lower section of the Table 1 lists the focal distance f, the $F_{NO}$, and the value of $R_{G21}/f_w$ of the zoom lens of this embodiment.

TABLE 1

| # | R | D | $N_d$ | $v_d$ |
|---|---|---|---|---|
| 1 | 28.810 | 2.01 | 1.64974 | 33.8 |
| 2 | −5162.409 | 0.55 | | |
| 3 | −32.822 | 1.07 | 1.83400 | 33.5 |
| 4 | 43.806 | 0.10 | | |
| 5 | 10.335 | 2.02 | 1.48749 | 70.4 |
| 6 | 40.429 | $D_6$ | | |
| 7 | ∞ | $D_7$ | | |
| 8 | −7.922 | 1.00 | 1.63880 | 59.6 |
| 9 | −11.303 | 0.10 | | |
| 10 | 13.285 | 1.89 | 1.48749 | 70.4 |
| 11 | −21.476 | 0.57 | | |
| 12 | 204.995 | 1.00 | 1.83401 | 35.7 |
| 13 | 19.625 | 0.29 | | |
| 14* | 44.267 | 1.78 | 1.70043 | 37.0 |
| 15* | −15.550 | $D_{15}$ | | |
| 16* | −7.967 | 1.40 | 1.49023 | 57.5 |
| 17* | −11.149 | 0.27 | | |
| 18 | −9.971 | 1.30 | 1.64542 | 59.2 |
| 19 | ∞ | | | |

| | WIDE | TELE |
|---|---|---|
| $D_6$ | 3.00 | 4.30 |
| $D_7$ | 0.90 | 6.84 |
| $D_{15}$ | 7.54 | 1.60 |
| f = 23.29–87.10 | $F_{NO}$ = 5.7–9.9 | $R_{G21}/f_w$ = −0.34 |

In addition, Table 2 lists values of the coefficients K, $a_4$, $a_6$, $a_8$ and $a_{10}$ in Eq. (A) above for the aspherical surfaces.

TABLE 2

| # | K | $a_4$ | $a_6$ | $a_8$ | $a_{10}$ |
|---|---|---|---|---|---|
| 14 | 1.0021219 | −0.8940081 × $10^{-4}$ | −0.5028311 × $10^{-6}$ | −0.7458786 × $10^{-8}$ | −0.4637929 × $10^{-10}$ |
| 15 | 0.4979132 | 0.8322891 × $10^{-4}$ | 0.4032301 × $10^{-6}$ | 0.1014452 × $10^{-7}$ | 0.8125708 × $10^{-10}$ |
| 16 | −0.5317301 | 0.4588724 × $10^{-4}$ | 0.7189060 × $10^{-6}$ | −0.8209703 × $10^{-9}$ | −0.1273897 × $10^{-9}$ |
| 17 | 1.2835692 | −0.2604726 × $10^{-5}$ | −0.2800236 × $10^{-6}$ | −0.5865696 × $10^{-9}$ | 0.2339728 × $10^{-10}$ |

As shown in the lower section of Table 1, the value of $R_{G21}/f_w$ becomes −0.34, and thus Condition (1) above is satisfied for this embodiment. In addition, the image angle 2ω at the wide-angle end is 73.8°.

Embodiment 2

Figure 2:
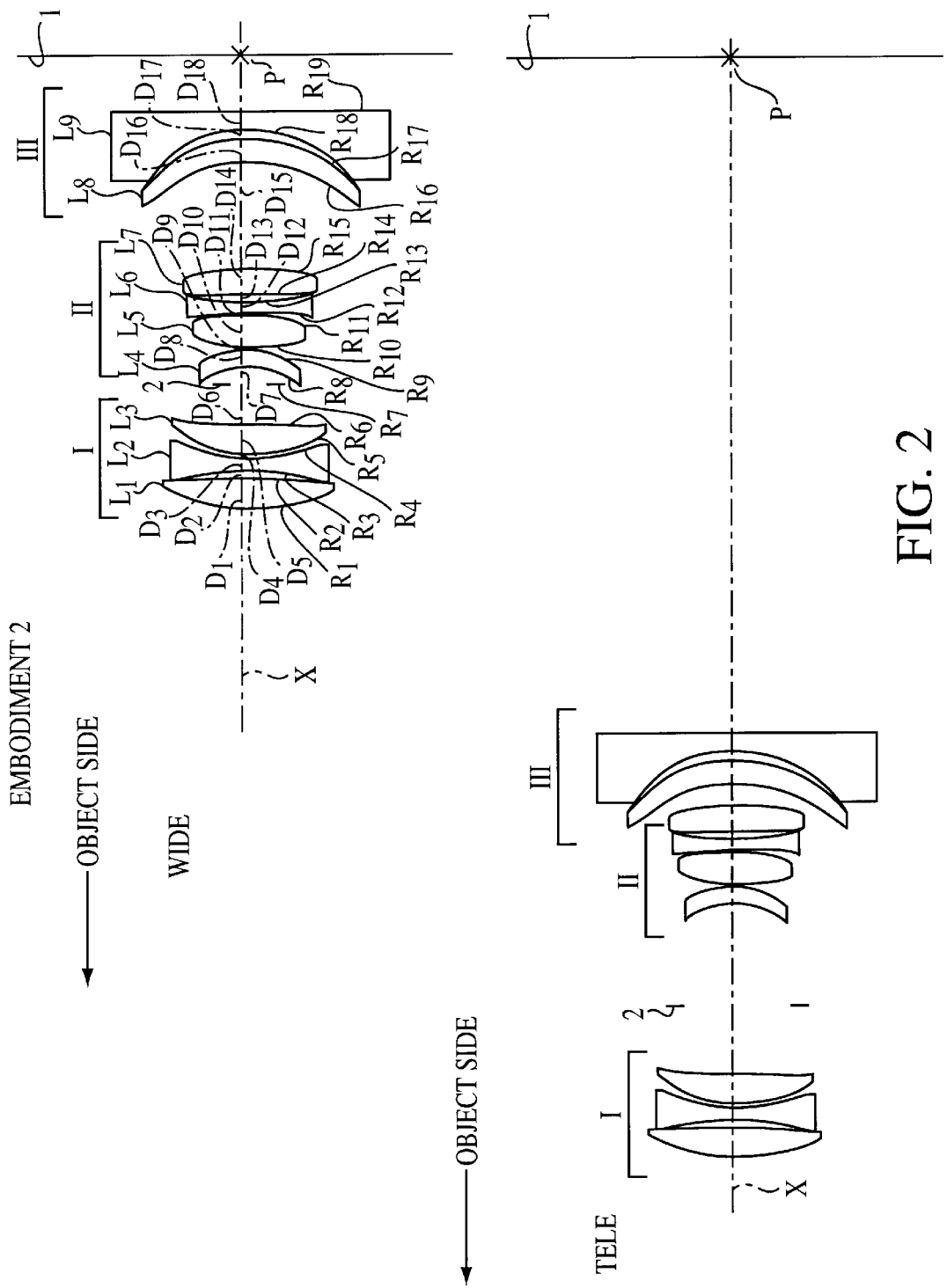
FIG. 2 illustrates the basic lens construction in accordance with a second embodiment of the present invention, at both the wide-angle end and telephoto end.

The zoom lens relating to Embodiment 2 is shown in FIG. 2, which shows the position at both the wide-angle end and the telephoto end. The zoom lens relating to Embodiment 2 has the same construction as that of Embodiment 1 except that the sixth lens element $L_6$ in this embodiment is a biconcave lens.

The upper section of Table 3 below lists the surface number #, in order from the object side, the radius of curvature R (in mm) of each surface near the optical axis, the on-axis spacing D (in mm) between each surface, as well as the index of refraction $N_d$ and the Abbe number $v_d$ (at the sodium d line) of each lens element of Embodiment 2. Those surfaces with a * to the right of the surface number in Table 3 are aspherical surfaces, and the aspherical surface shape is expressed by Eq. (A) above.

The center section of Table 3 lists, for both the wide-angle end (WIDE) and the telephoto end (TELE), the spacing $D_6$ between the first lens group I and the diaphragm 2; the spacing $D_7$ between the diaphragm 2 and the second lens group II; and the spacing $D_{15}$ between the second lens group II and the third lens group III.

The lower section of the Table 3 lists the focal distance f, the $F_{NO}$, and the value of $R_{G21}/f_w$ of the zoom lens of this embodiment.

TABLE 3

| # | R | D | $N_d$ | $v_d$ |
|---|---|---|---|---|
| 1 | 16.548 | 1.88 | 1.66845 | 36.6 |
| 2 | −141.093 | 0.35 | | |
| 3 | −35.239 | 1.01 | 1.83421 | 37.1 |
| 4 | 14.711 | 0.10 | | |
| 5 | 9.023 | 1.93 | 1.48749 | 70.4 |
| 6 | 50.499 | $D_6$ | | |
| 7 | ∞ | $D_7$ | | |
| 8 | −5.497 | 1.00 | 1.49762 | 65.1 |
| 9 | −6.683 | 0.12 | | |
| 10 | 12.552 | 2.25 | 1.48749 | 70.4 |
| 11 | −13.107 | 0.10 | | |
| 12 | −48.136 | 1.01 | 1.83427 | 39.4 |
| 13 | 25.917 | 0.23 | | |
| 14* | 45.855 | 1.69 | 1.66530 | 32.6 |
| 15* | −19.115 | $D_{15}$ | | |
| 16* | −8.553 | 1.40 | 1.49023 | 57.5 |
| 17* | −11.946 | 0.64 | | |
| 18 | −9.622 | 1.30 | 1.67853 | 57.6 |
| 19 | ∞ | | | |

| | WIDE | TELE |
|---|---|---|
| $D_6$ | 3.00 | 4.61 |
| $D_7$ | 1.30 | 6.81 |
| $D_{15}$ | 7.11 | 1.60 |
| f = 23.26–86.84 | $F_{NO}$ = 5.7–9.9 | $R_{G21}/f_w$ = −0.24 |

In addition, Table 4 lists values of the coefficients K, $a_4$, $a_6$, $a_8$ and $a_{10}$ in Eq. (A) above for the aspherical surfaces.

TABLE 4

| # | K | $a_4$ | $a_6$ | $a_8$ | $a_{10}$ |
|---|---|---|---|---|---|
| 14 | 0.9926370 | −0.1145335 × 10$^{-3}$ | −0.6579069 × 10$^{-6}$ | −0.8636244 × 10$^{-8}$ | −0.5264167 × 10$^{-10}$ |
| 15 | 0.3608904 | 0.1014806 × 10$^{-3}$ | 0.5977515 × 10$^{-6}$ | 0.1170074 × 10$^{-7}$ | 0.8860740 × 10$^{-10}$ |
| 16 | −0.9675773 | 0.5422718 × 10$^{-4}$ | 0.7209337 × 10$^{-6}$ | −0.1660916 × 10$^{-8}$ | −0.1584739 × 10$^{-9}$ |
| 17 | 1.3265417 | −0.4460307 × 10$^{-5}$ | −0.4084715 × 10$^{-6}$ | −0.2025643 × 10$^{-8}$ | 0.3211308 × 10$^{-10}$ |

As shown in the lower section of Table 3, the value of $R_{G21}/f_w$ becomes −0.24, and thus Condition (1) above is satisfied for this embodiment. In addition, the image angle 2ω at the wide-angle end is 73.8°.

Embodiment 3

Figure 3:
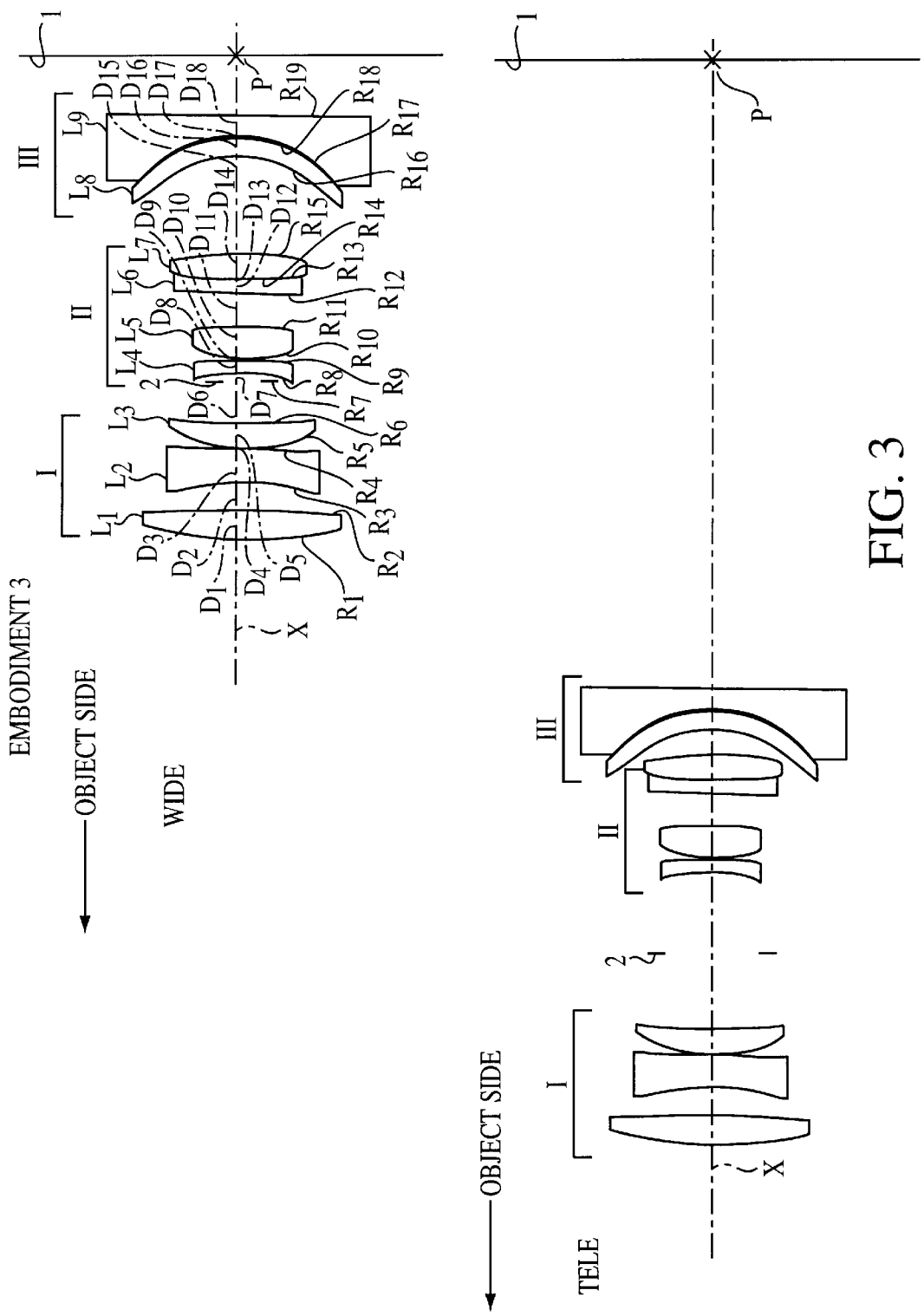
FIG. 3 illustrates the basic lens construction in accordance with a third embodiment of the present invention, at both the wide-angle end and telephoto end.

The zoom lens relating to Embodiment 3 is shown in FIG. 3, which shows the zoom lens at both the wide-angle end and the telephoto end. The zoom lens relating to Embodiment 3 has the same construction as that of Embodiment 1 except that, in this embodiment, the first lens element $L_1$ is a positive meniscus lens with its convex surface on the object side.

The upper section of Table 5 below lists the surface number #, in order from the object side, the radius of curvature R (in mm) of each lens element surface near the optical axis, the on-axis spacing D (in mm) between each lens element surface, as well as the index of refraction $N_d$ and the Abbe number $v_d$ (at the sodium d line) of Embodiment 3. Those surfaces with a * to the right of the surface number in Table 5 are aspherical surfaces, and the aspherical surface shape is expressed by Eq. (A) above.

In the center section of Table 5 are listed, for both the wide-angle end (WIDE) and the telephoto end (TELE), the spacing $D_6$ between the first lens group I and the diaphragm 2; the spacing $D_7$ between the diaphragm 2 and the second lens group II, and the spacing $D_{15}$ between the second lens group II and the third lens group III.

Also, in the lower section of the Table 5, are listed the focal distance f, the $F_{NO}$, and the value of $R_{G21}/f_w$ of the zoom lens of this embodiment. In addition, the value of the $R_{G21}/f_w$ is −0.73, which satisfies the Condition (1). In addition, the image angle 2ω at the wide angle end becomes 73.80°.

TABLE 5

| # | R | D | $N_d$ | $v_d$ |
|---|---|---|---|---|
| 1 | 32.671 | 1.79 | 1.58040 | 40.0 |
| 2 | 140.573 | 2.01 | | |
| 3 | −28.011 | 2.50 | 1.83400 | 35.8 |
| 4 | 156.857 | 0.10 | | |
| 5 | 11.877 | 1.61 | 1.48749 | 70.4 |
| 6 | 61.968 | $D_6$ | | |
| 7 | ∞ | $D_7$ | | |
| 8 | −17.000 | 1.00 | 1.77706 | 50.3 |
| 9 | −31.981 | 0.10 | | |
| 10 | 12.160 | 2.22 | 1.48749 | 70.4 |
| 11 | −104.818 | 2.15 | | |
| 12 | 81.123 | 1.00 | 1.83400 | 23.5 |
| 13 | 30.593 | 0.10 | | |
| 14* | 31.790 | 1.96 | 1.68873 | 34.5 |
| 15* | −17.930 | $D_{15}$ | | |
| 16* | −7.407 | 1.40 | 1.49023 | 57.5 |
| 17* | −10.900 | 0.10 | | |
| 18 | −10.012 | 1.30 | 1.69835 | 56.6 |

TABLE 5-continued

| 19 | ∞ | | | |
|---|---|---|---|---|

| | WIDE | TELE |
|---|---|---|
| $D_6$ | 3.00 | 5.11 |
| $D_7$ | 0.60 | 5.79 |

TABLE 5-continued

| $D_{15}$ | 6.79 | 1.60 |
|---|---|---|
| f = 23.31–87.13 | $F_{NO}$ = 5.7–9.9 | $R_{G21}/f_w$ = -0.73 |

In addition, Table 6 ists values of the coefficients K, $a_4$, $a_6$, $a_8$, and $a_{10}$ in Eq. (A) above for the aspherical surfaces.

TABLE 6

| # | K | $a_4$ | $a_6$ | $a_8$ | $a_{10}$ |
|---|---|---|---|---|---|
| 14 | 0.9942777 | -0.1014581 × 10⁻³ | -0.5429798 × 10⁻⁶ | -0.7740082 × 10⁻⁸ | -0.5647785 × 10⁻¹⁰ |
| 15 | 0.4629404 | 0.8848573 × 10⁻⁴ | 0.3865850 × 10⁻⁶ | 0.9685035 × 10⁻⁸ | 0.8249286 × 10⁻¹⁰ |
| 16 | -0.4767531 | 0.4340429 × 10⁻⁴ | 0.7198304 × 10⁻⁶ | 0.7560969 × 10⁻⁹ | -0.8295763 × 10⁻¹⁰ |
| 17 | 1.3994311 | 0.1125468 × 10⁻⁵ | -0.1619141 × 10⁻⁶ | -0.1839899 × 10⁻⁹ | 0.1957988 × 10⁻¹⁰ |

As shown in the lower section of Table 5, the value of $R_{G21}/f_w$ becomes -0.73, and thus Condition (1) above is satisfied for this embodiment. In addition, the image angle 2ω at the wide-angle end is 73.8°.

Figure 4:
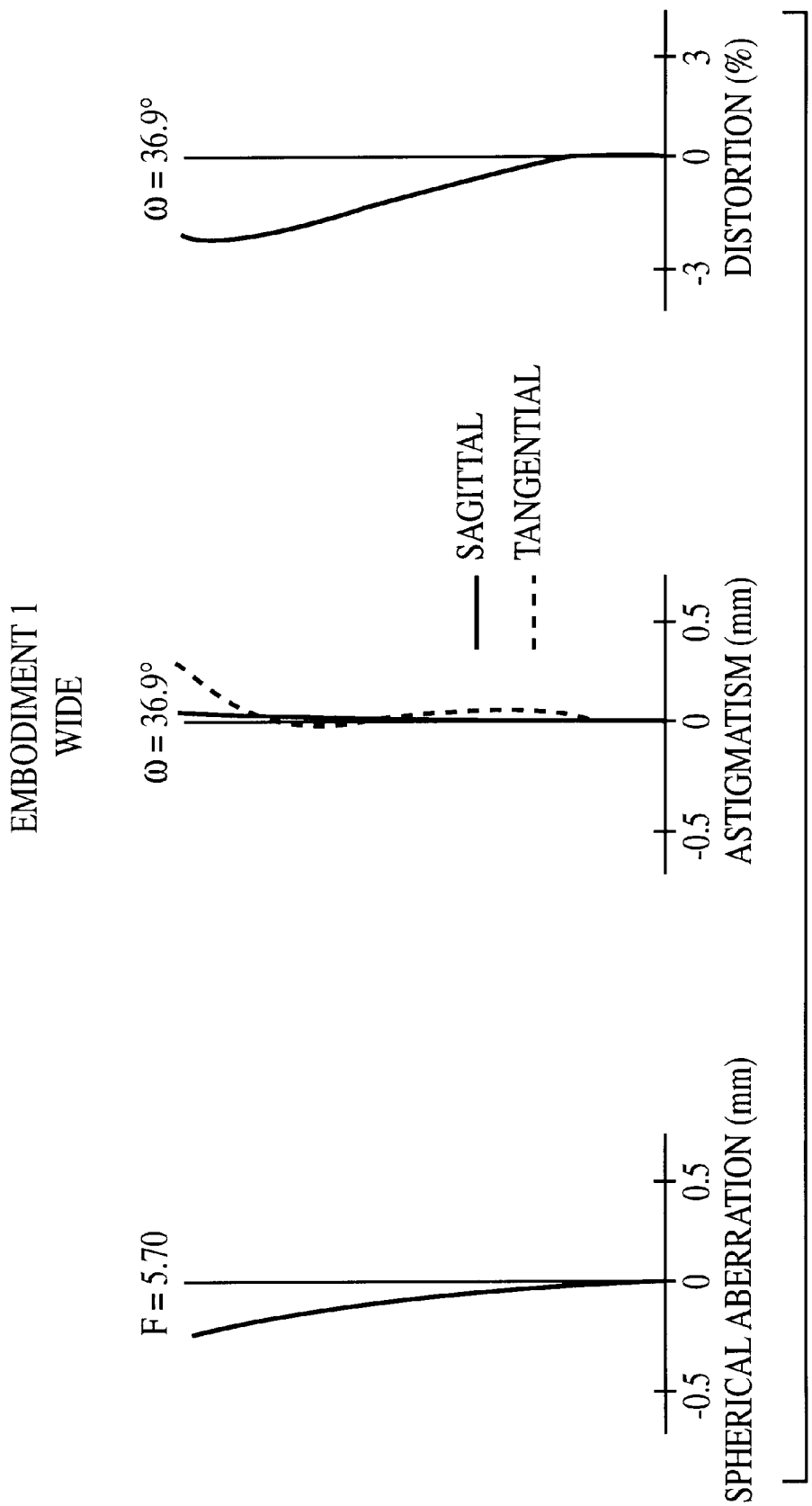
FIG. 4 illustrates the spherical aberration, astigmatism, and distortion at the wide-angle end for Embodiment 1.
Figure 6:
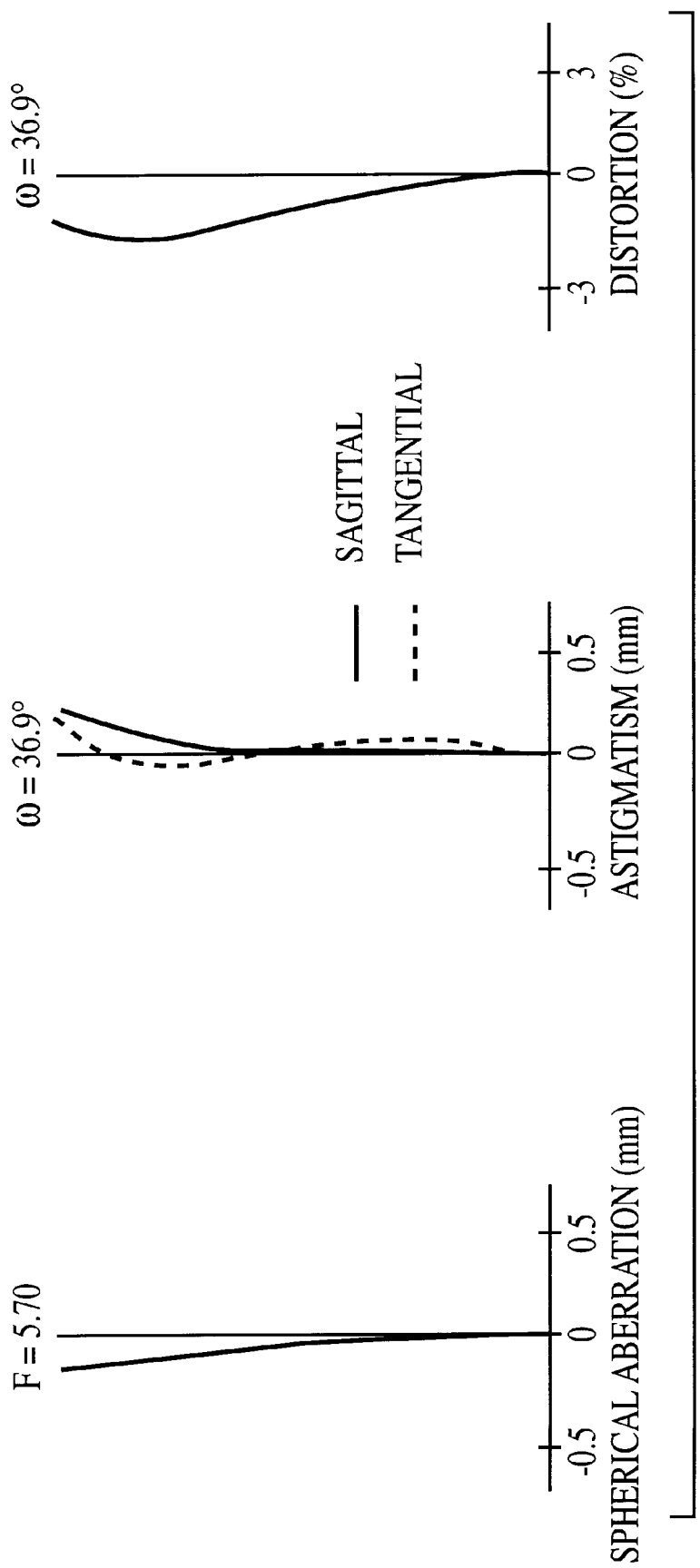
FIG. 6 illustrates the spherical aberration, astigmatism, and distortion at the wide-angle end for Embodiment 2.
Figure 8:
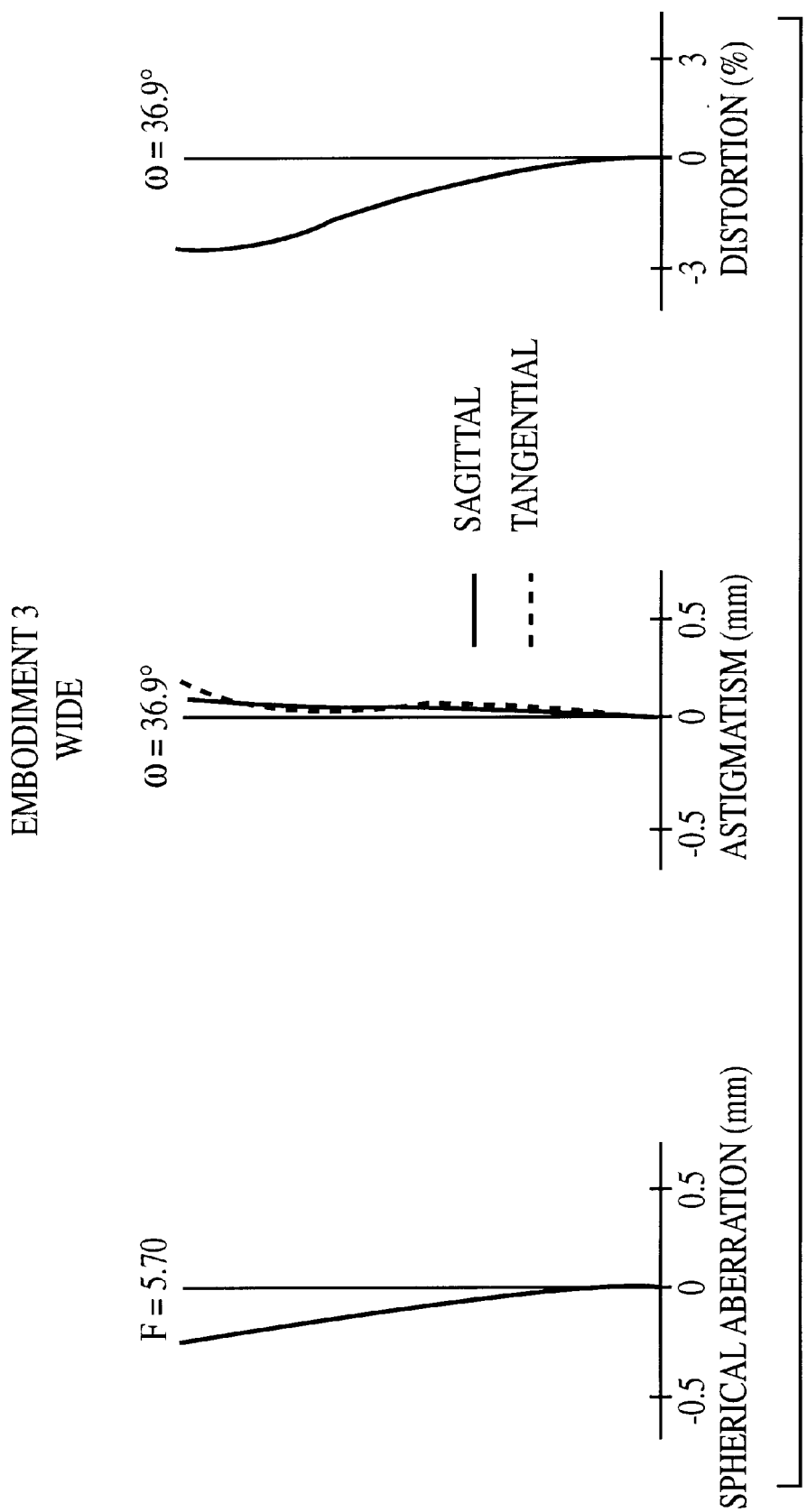
FIG. 8 illustrates the spherical aberration, astigmatism, and distortion at the wide-angle end for Embodiment 3; and, FIG. 9 illustrates the spherical aberration, astigmatism, and distortion at the telephoto end for Embodiment 3.

FIGS. 4, 6, and 8 each illustrate the spherical aberration, astigmatism (in the sagittal S and tangential T planes) and distortion at the wide-angle end of the zoom lens of Embodiments 1–3, respectively.

Figure 5:
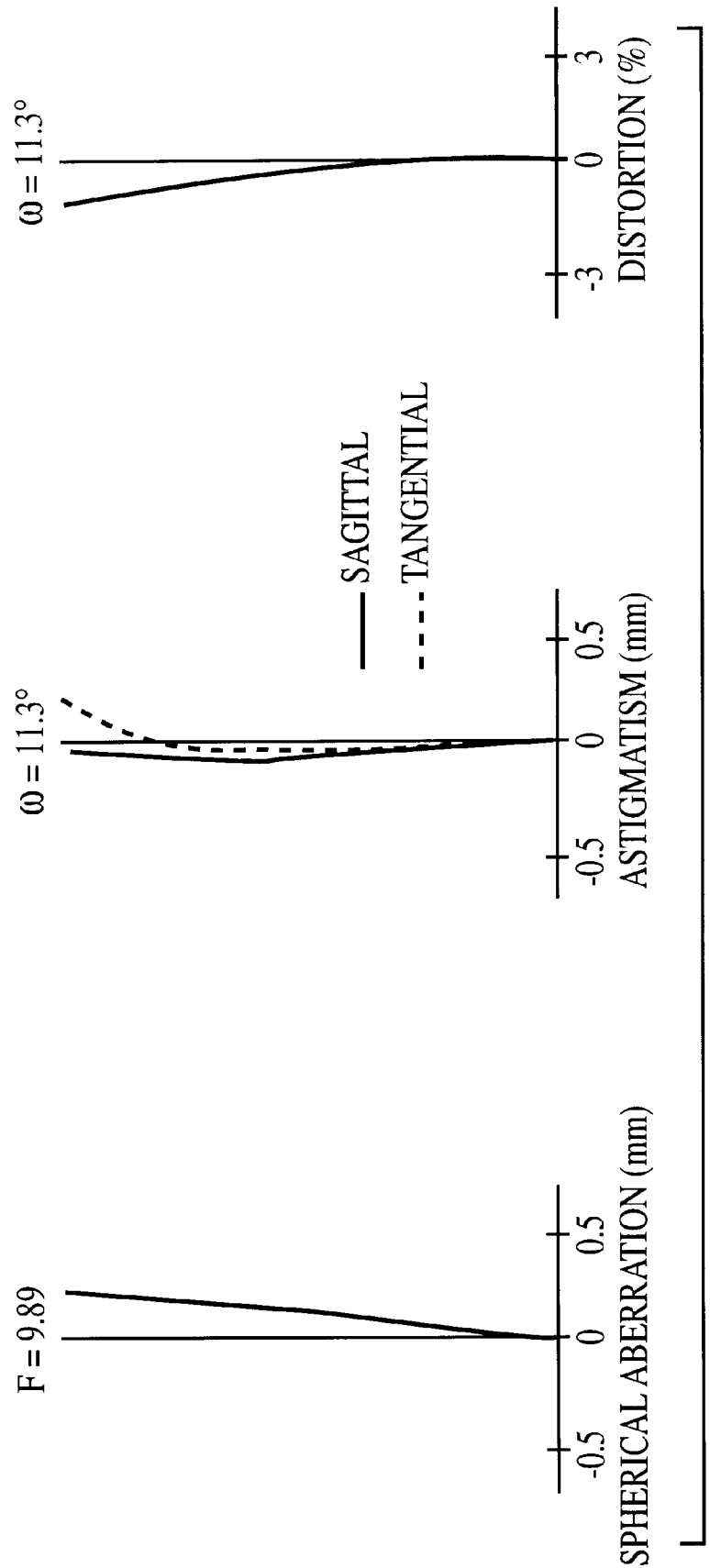
FIG. 5 illustrates the spherical aberration, astigmatism, and distortion at the telephoto end for Embodiment 1.
Figure 7:
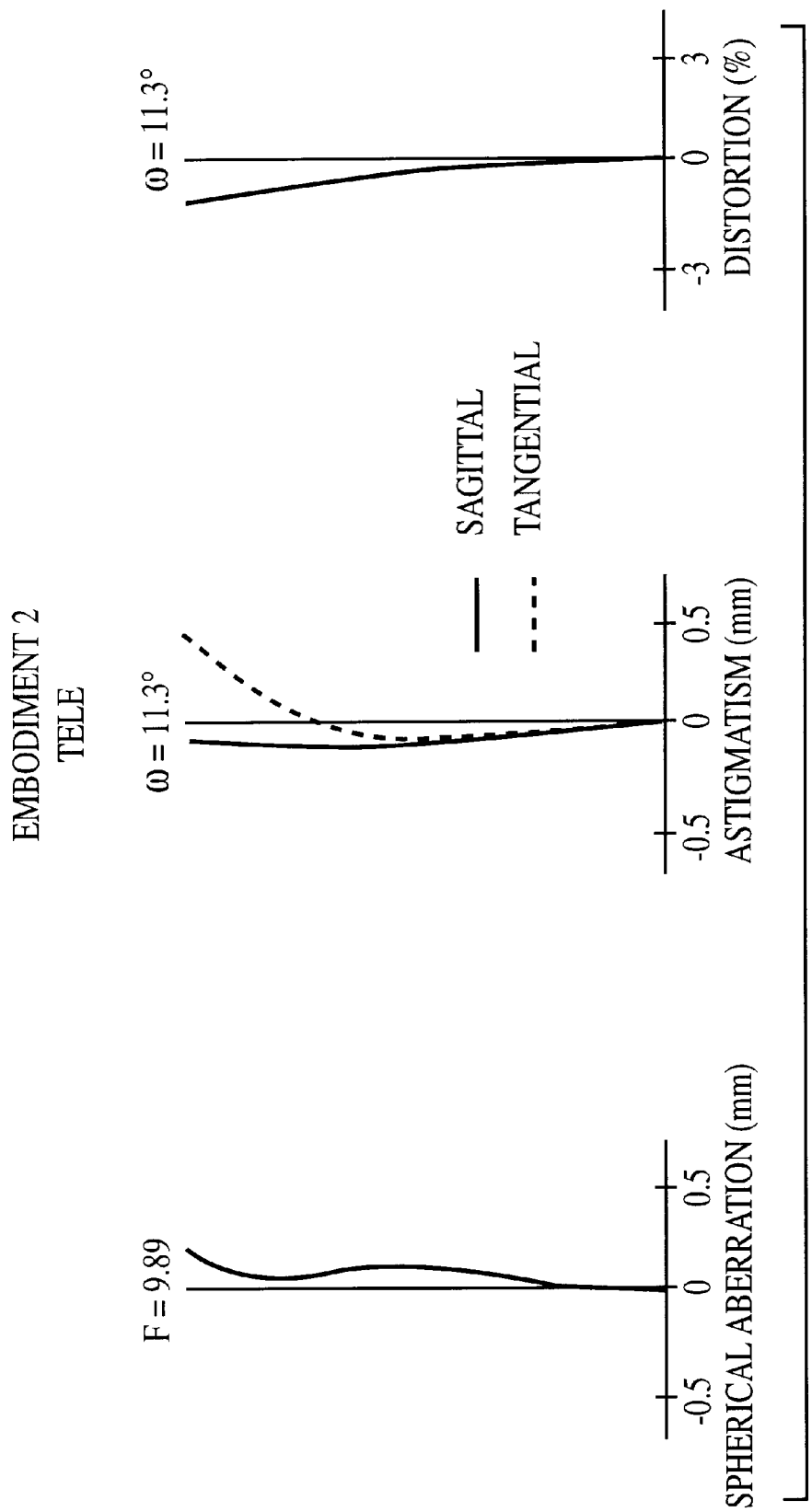
FIG. 7 illustrates the spherical aberration, astigmatism, and distortion at the telephoto end for Embodiment 2.
Figure 9:
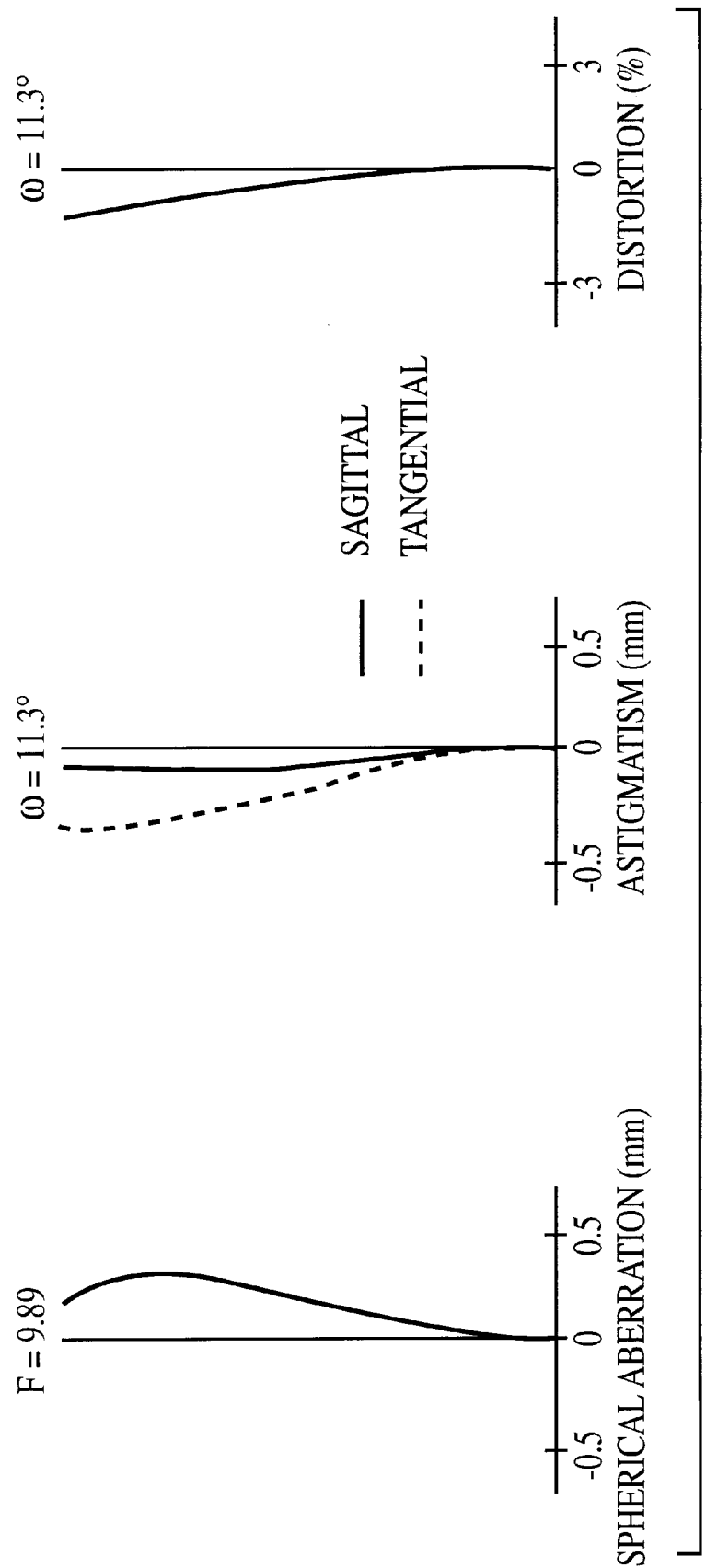

FIGS. 5, 7 and 9 each illustrate the spherical aberration, astigmatism (in the sagittal S and tangential T planes) and distortion at the telephoto end of the zoom lens of Embodiments 1–3, respectively.

As is clear from these aberration diagrams, the aberrations can be favorably corrected for each of the described embodiments.

Furthermore, for each of the described embodiments, the image angle at the wide-angle end is 70° or greater, the $F_{NO}$ at the telephoto end is less than 10, and the zoom ratio is greater than 3.6.

According to the zoom lens of the present invention, a bright lens system can be obtained with a compact three-group construction having a wide image angle, and the overall length of the zoom lens at the telephoto end can be made short. Furthermore, the various aberrations over the entire field of view can be favorably corrected for object distances ranging from infinity to nearby, enabling optical performance with high resolution and high contrast to be obtained.

In addition, since the diaphragm is moved as a unit with the third lens group at the time of zooming, the lens drive mechanism can be simplified in order to reduce construction costs. And, by employing an aspherical lens surface in the second lens group and in the third lens group, additional compactness is achieved while simultaneously favorably correcting the various aberrations.

Of course, the zoom lens of the invention is not to be limited to the embodiments specifically ilustrated above. Rather the scope of the invention shall be defined as set forth in the following claims and their legal equivalents. Various modifications will occur to those skilled in the art as a result of reading the above description, and all such modifications as would be obvious to one of ordinary skill in the art are intended to be within the spirit of the invention disclosed.

What is claimed is:

1. A zoom lens having no more than three lens groups, said zoom lens comprising, in order from the object side:
a first lens group which has positive refractive power;
a diaphragm;
a second lens group which has positive refractive power; and,
a third lens group which has negative refractive power, wherein,
zooming is accomplished by changing the spacing between each of the lens groups and, when zooming from the wide-angle end to the telephoto end, the diaphragm and the third lens group are moved as a unit while
the spacing between the first lens group and the diaphragm is increased,
the spacing between the diaphragm and the second lens group is increased, and
the spacing between the second lens group and the third lens group is decreased.

2. The zoom lens of claim 1, wherein the third lens group includes at least one aspheric surface.

3. The zoom lens of claim 1, wherein the following condition is satisfied $$-0.75 < R_{G21}/f_w < -0.23$$

where
$R_{G21}$ is the radius of curvature of the surface of the second lens group that is nearest the object side, and $f_w$ is the focal length of the zoom lens at the wide-angle end.

4. The zoom lens of claim 2, wherein the following condition is satisfied $$-0.75 < R_{G21}/f_w < -0.23$$

where
$R_{G21}$ is the radius of curvature of the surface of the second lens group that is nearest the object side, and $f_w$ is the focal length of the zoom lens at the wide-angle end.

5. The zoom lens of claim 1, wherein the surface of the second lens group that is nearest the image side is made to be an aspherical surface.

6. The zoom lens of claim 2, wherein the surface of the second lens group that is nearest the image side is made to be an aspherical surface.

7. The zoom lens of claim 3, wherein the surface of the second lens group that is nearest the image side is made to be an aspherical surface.

8. The zoom lens of claim 1, wherein the second lens group includes, in order from the object side, a negative meniscus lens element with its concave surface on the object side; a bi-convex lens element; a lens element having negative refractive power; and a bi-convex lens element.

9. The zoom lens of claim 2, wherein the second lens group includes, in order from the object side, a negative meniscus lens element with its concave surface on the object side; a bi-convex lens element; a lens element having negative refractive power; and a bi-convex lens element.

10. The zoom lens of claim 3, wherein the second lens group includes, in order from the object side, a negative meniscus lens element with its concave surface on the object side; a bi-convex lens element; a lens element having negative refractive power; and a bi-convex lens element.

11. The zoom lens of claim 4, wherein the second lens group includes, in order from the object side, a negative meniscus lens element with its concave surface on the object side; a bi-convex lens element; a lens element having negative refractive power; and a bi-convex lens element.

12. The zoom lens of claim 1, said zoom lens further having the following construction:

| # | R | D | $N_d$ | $v_d$ |
|---|---|---|---|---|
| 1 | 28.810 | 2.01 | 1.64974 | 33.8 |
| 2 | −5162.409 | 0.55 | | |
| 3 | −32.822 | 1.07 | 1.83400 | 33.5 |
| 4 | 43.806 | 0.10 | | |
| 5 | 10.335 | 2.02 | 1.48749 | 70.4 |
| 6 | 40.429 | $D_6$ | | |
| 7 | ∞ | $D_7$ | | |
| 8 | −7.922 | 1.00 | 1.63880 | 59.6 |
| 9 | −11.303 | 0.10 | | |
| 10 | 13.285 | 1.89 | 1.48749 | 70.4 |
| 11 | −21.476 | 0.57 | | |
| 12 | 204.995 | 1.00 | 1.83401 | 35.7 |
| 13 | 19.625 | 0.29 | | |
| 14 | 44.267 | 1.78 | 1.70043 | 37.0 |
| 15 | −15.550 | $D_{15}$ | | |
| 16 | −7.967 | 1.40 | 1.49023 | 57.5 |
| 17 | −11.149 | 0.27 | | |
| 18 | −9.971 | 1.30 | 1.64542 | 59.2 |
| 19 | ∞ | | | | where # is surface number in order from the object side, R is the radius of curvature (in mm) of each surface near the optical axis, D is the on-axis spacing (in mm) between each surface, $D_6$ is variable between 3.00–4.30, $D_7$ is variable between 0.90–6.84, $D_{15}$ is variable between 7.54–1.60, $N_d$ is the index of refraction (at the sodium d line) and $v_d$ is the Abbe number.

13. The zoom lens of claim 1, said zoom lens furher having the following construction:

| # | R | D | $N_d$ | $v_d$ |
|---|---|---|---|---|
| 1 | 16.548 | 1.88 | 1.66845 | 36.6 |
| 2 | −141.093 | 0.35 | | |
| 3 | −35.239 | 1.01 | 1.83421 | 37.1 |
| 4 | 14.711 | 0.10 | | |
| 5 | 9.028 | 1.93 | 1.48749 | 70.4 |
| 6 | 50.499 | $D_6$ | | |
| 7 | ∞ | $D_7$ | | |
| 8 | −5.497 | 1.00 | 1.49762 | 65.1 |
| 9 | −6.683 | 0.12 | | |
| 10 | 12.552 | 2.25 | 1.48749 | 70.4 |
| 11 | −13.107 | 0.10 | | |
| 12 | −48.136 | 1.01 | 1.83427 | 39.4 |
| 13 | 25.917 | 0.23 | | |
| 14 | 45.855 | 1.69 | 1.66530 | 32.6 |
| 15 | −19.115 | $D_{15}$ | | |
| 16 | −8.553 | 1.40 | 1.49023 | 57.5 |
| 17 | −11.946 | 0.64 | | |
| 18 | −9.622 | 1.30 | 1.67853 | 57.6 |
| 19 | ∞ | | | | where # is surface number in order ftom the object side, R is the radius of curvature (in mm) of each surface near the optical axis, D is the on-axis spacing (in mm) between each surface, $D_6$ is variable between 3.00–4.61, $D_7$ is variable between 1.30–6.81, $D_{15}$ is variable between 7.11–1.60, $N_d$ is the index of refraction (at the sodium d line) and $v_d$ is the Abbe number.

14. The zoom lens of claim 1, said zoom lens further having the following construction:

| # | R | D | $N_d$ | $v_d$ |
|---|---|---|---|---|
| 1 | 32.671 | 1.79 | 1.58040 | 40.0 |
| 2 | 140.573 | 2.01 | | |
| 3 | −28.011 | 2.50 | 1.83400 | 35.8 |
| 4 | 156.857 | 0.10 | | |
| 5 | 11.877 | 1.61 | 1.48749 | 70.4 |
| 6 | 61.968 | $D_6$ | | |
| 7 | ∞ | $D_7$ | | |
| 8 | −17.000 | 1.00 | 1.77706 | 50.3 |
| 9 | −31.981 | 0.10 | | |
| 10 | 12.160 | 2.22 | 1.48749 | 70.4 |
| 11 | −104.818 | 2.15 | | |
| 12 | 81.123 | 1.00 | 1.83400 | 23.5 |
| 13 | 30.593 | 0.10 | | |
| 14 | 31.790 | 1.96 | 1.68873 | 34.5 |
| 15 | −17.930 | $D_{15}$ | | |
| 16 | −7.407 | 1.40 | 1.49023 | 57.5 |
| 17 | −10.900 | 0.10 | | |
| 18 | −10.012 | 1.30 | 1.69835 | 56.6 |
| 19 | ∞ | | | | where # is surface number in order from the object side, R is the radius of curvature (in mm) of each surface near the optical axis, D is the on-axis spacing (in mm) between each surface, $D_6$ is variable between 3.00–5.11, $D_7$ is variable between 0.60–5.79, $D_{15}$ is variable between 6.79–1.60, $N_d$ is the index of refraction (at the sodium d line) and $v_d$ is the Abbe number.

15. A zoom lens comprising, in order from the object side:
a first lens group which has positive refractive power;
a diaphragm;
a second lens group which has positive refractive power; and,
a third lens group which has negative refractive power, wherein,
zooming is accomplished by changing the spacing between each of the lens groups and, when zooming from the wide-angle end to the telephoto end, the diaphragm and the third lens group are moved as a unit while
the spacing between the first lens group and the diaphragm is increased,
the spacing between the diaphragm and the second lens group is increased, and
the spacing between the second lens group and the third lens group is decreased.

* * * * *

UNITED STATES PATENT AND TRADEMARK OFFICE
CERTIFICATE OF CORRECTION

PATENT NO : 6,078,432
DATED : Jun. 20, 2000
INVENTOR(S): Toyama

It is certified that error appears in the above-identified patent and that said Letters Patent are hereby corrected as shown below:

At col. 6, line 26, change "73.80°" to -- 73.8° --;

At col. 7, line 7, change "ists" to -- lists --.

Signed and Sealed this

Twenty-second Day of May, 2001

*Attest:*

NICHOLAS P. GODICI

*Attesting Officer*   *Acting Director of the United States Patent and Trademark Office*